Nov. 26, 1940. R. M. GASTON 2,222,764
HIGH-DUTY ENCLOSED ELECTRIC MOTOR
Filed Nov. 11, 1937 3 Sheets-Sheet 1
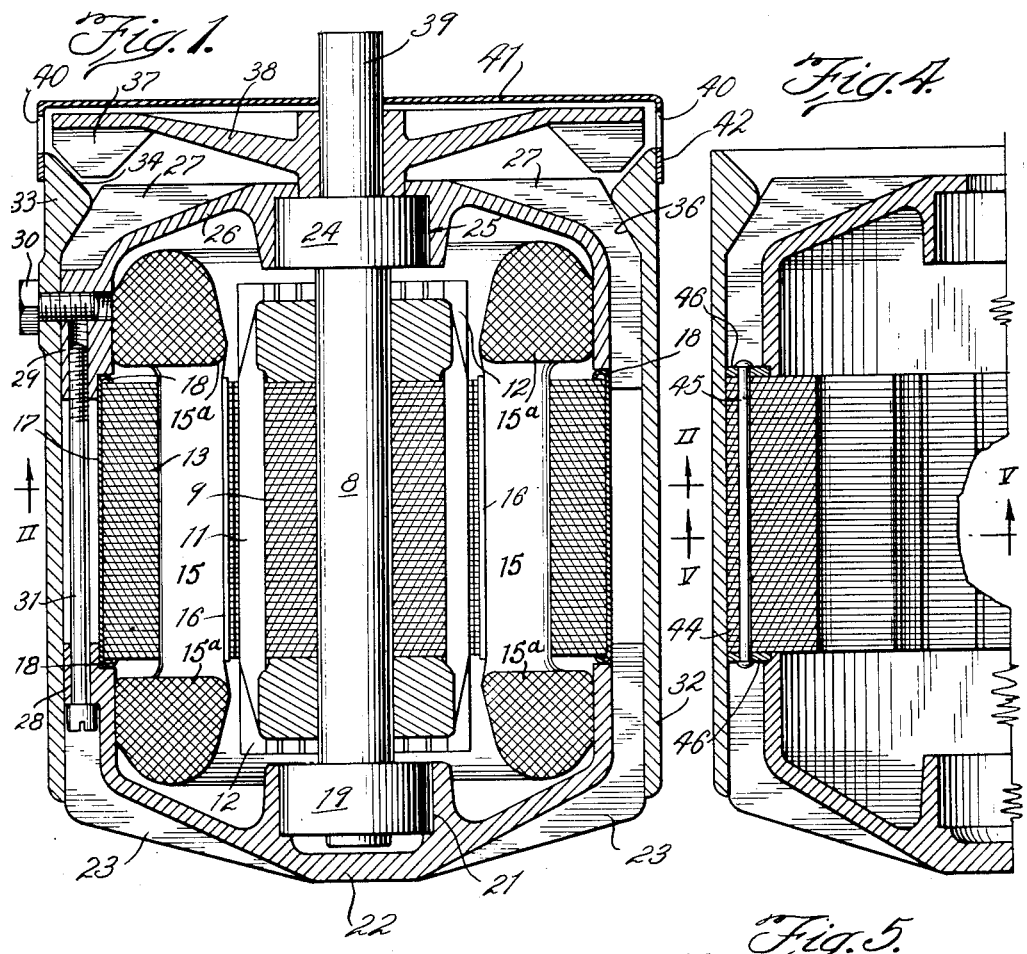
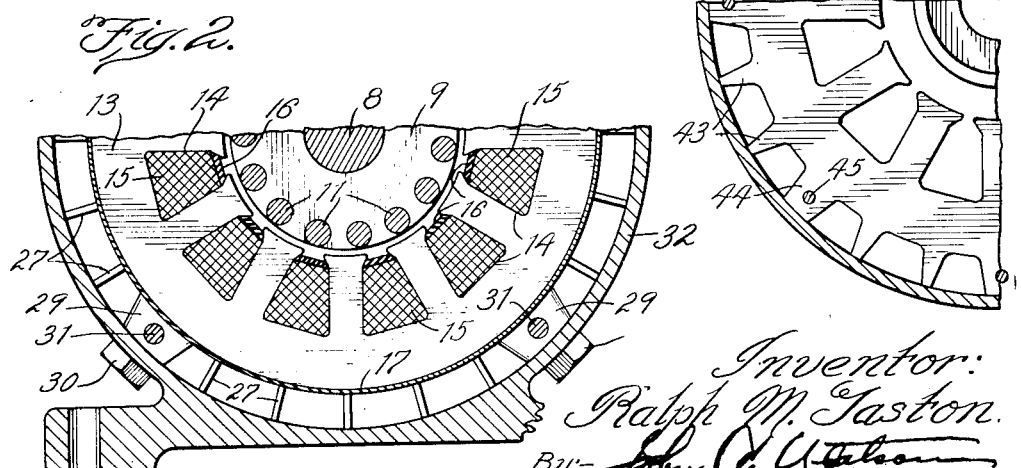

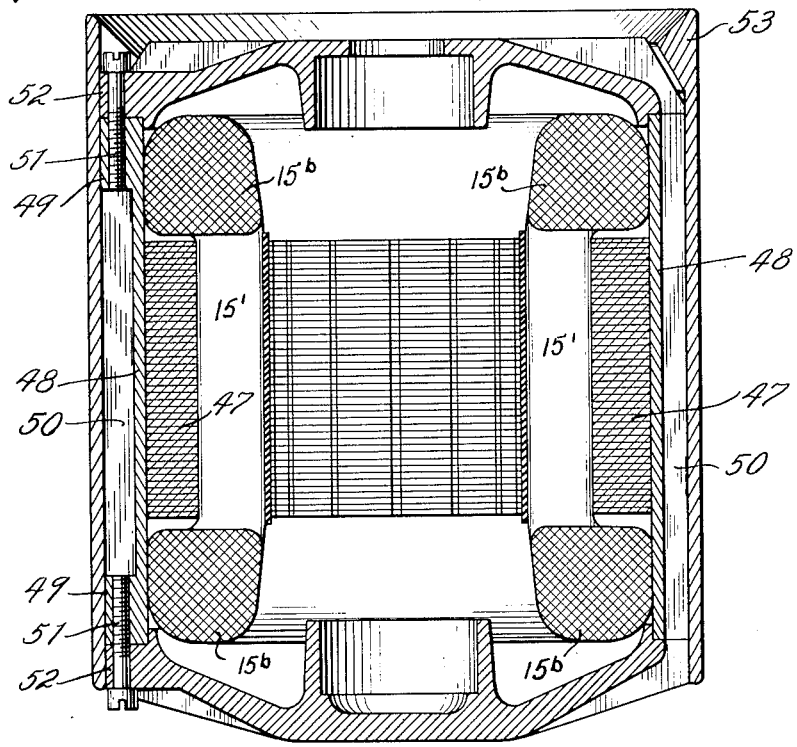
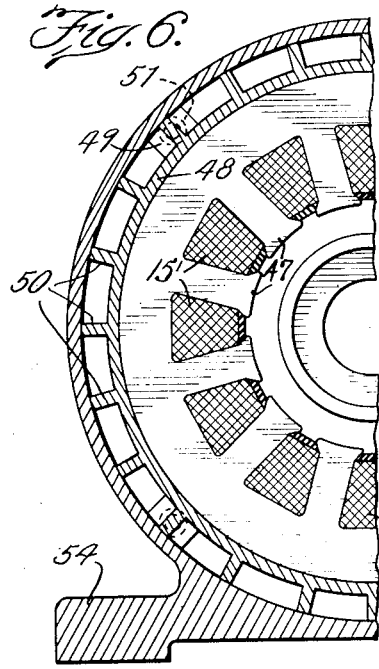
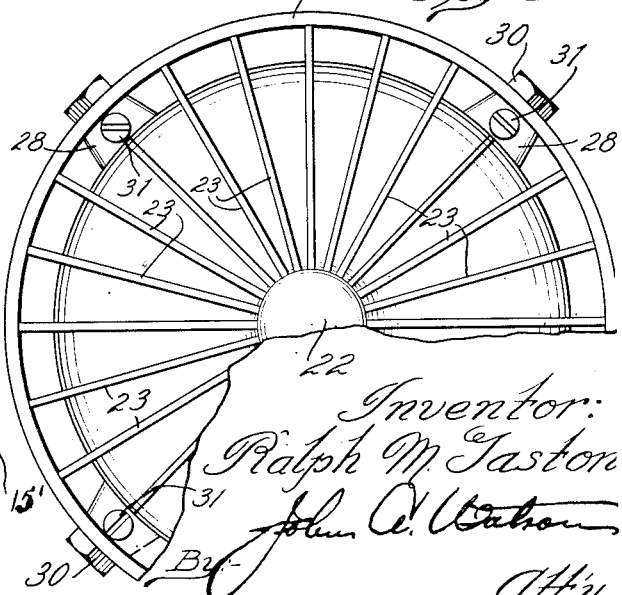

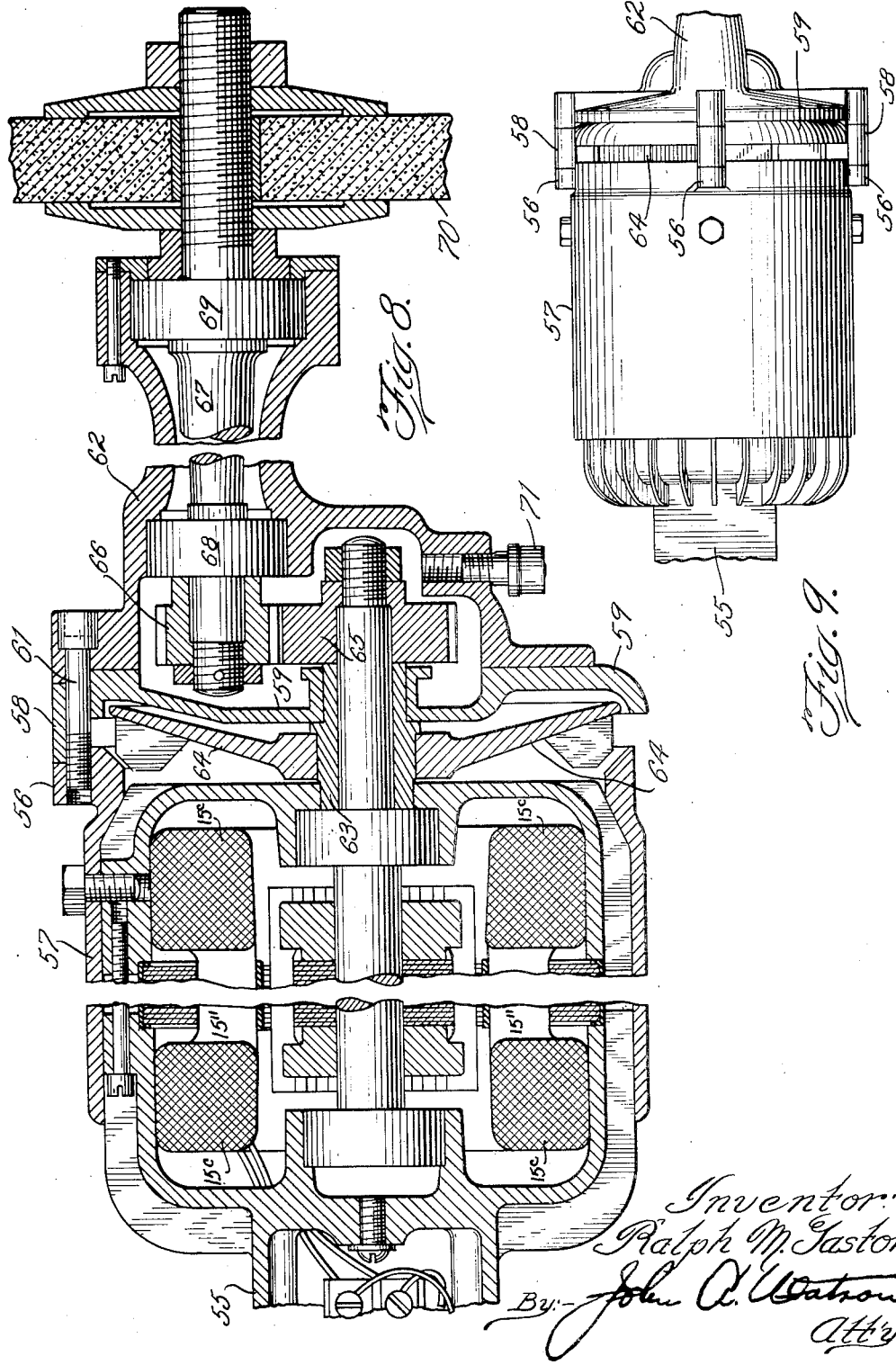

Patented Nov. 26, 1940

2,222,764

UNITED STATES PATENT OFFICE 2,222,764

HIGH-DUTY ENCLOSED ELECTRIC MOTOR

Ralph M. Gaston, Chicago, Ill.

Application November 11, 1937, Serial No. 174,082

10 Claims. (Cl. 172—36)

This invention pertains to dynamo electric machines and, more particularly, to the dust and dirt proof construction of air cooled motors adapted to be used in grinding, polishing, sanding and similar operations under wet or dry conditions as well as for other operations in relatively clean or unclean surroundings whether the conditions of use be wet or dry. The invention will be disclosed as embodied in electric motors peculiarly adapted for grinding, polishing and sanding operations, wet or dry, since such conditions may be taken as among the worst to which motors and the like may be subjected.

Moisture and dirt injure motor windings, commutators and bearings. If the dirt includes metallic particles or abrasive material, the injury to insulation, windings, commutators and bearings may be very serious and, when dirt of any character accumulates in the windings or in cooling ducts or passages, overheating may result, with impaired efficiency or destruction. Motors used for grinding, polishing, sanding and similar purposes are particularly susceptible to injuries of these characters.

Portable motors for driving tools such as abrasive and polishing wheels must not only be prepared to meet the conditions mentioned but they must be relatively light and of sufficient power to perform the duties demanded of them. However, these specifications are not easy to fulfill as constructions designed to exclude dust, abrasives, metal particles, moisture and the like so increase the bulk and weight as to reduce the portability of the machine and tend to curtail use for that reason. Ordinary enclosed, dust and moisture proof motors are heavy, clumsy and costly, due to their large size and, in portable motors, the weight limit controls or determines the power which can be used.

Consequently, one of the primary objects of the invention is to provide an air cooled dust proof dynamo electric machine so constructed that it will have a relatively high duty rating (high power) per pound of weight or per unit (cubic inch) of displacement. In this connection it may be related that motors embodying the invention have been manufactured with a weight of less than 15 lbs. for a one horse power rating at 3450 R. P. M. In fact, the invention has enabled the manufacture of motors which are even lighter per H. P. than ordinary commercial (non-portable types) motors with standard ventilation.

Another important object of the invention is to provide a dynamo electric machine construction and design of such character that the stator or body and end casing members may be constructed in a simple and economical manner and so that those portions which may be cast will not require expensive, delicate and complicated molds and cores or difficult and expensive machining. The attainment of this object is particularly apparent in the manufacture of motors of the air cooled, dust proof portable type illustrated and described herein.

Still another important object is to provide an air cooled dynamo electric machine in which the air ducts or passageways are relatively straight from end to end thereof and are readily and easily accessible for thorough and quick cleaning by simple brushes or other tools without taking the motor apart. It will also be noted from the description and illustrated embodiments that one feature of the invention provides practically immediate accessibility to the motor stator, windings and cooling fins for cleaning, repair, etc., since a cooling jacket or outer casing is made readily removable through an end-wise sliding movement relative to the stator and associated parts and the remainder of the machine is easily and quickly disassembled.

A further object is to provide a portable, air cooled and dust proof dynamo electric machine of high efficiency at relatively low cost and one which is capable of heavy duty under extreme adverse conditions of dirt and moisture as well as abuse.

A still further object is to provide a dynamo electric machine in which the field or stator windings are in thermal contact with although electrically insulated from a casing substantially hermetically sealing the stator and rotor, whereby heat from the stator windings will be transmitted through the casing walls to the outside thereof, there to be absorbed and dissipated by a cooling air stream.

Many additional objects, the advantages and uses of the invention will become apparent after reading the following description and claims and after viewing the drawings in which:

Fig. 1 is a longitudinal sectional view of one type of dynamo electric machine showing one form of the invention applied thereto.

Fig. 2 is a fragmentary transverse sectional view taken along the line II—II of Fig. 1.

Fig. 3 is an end view looking at the left hand end of Fig. 1.

Fig. 4 is a longitudinal sectional view of one-half of a dynamo electric machine showing a modified form of the invention.

Fig. 5 is a fragmentary end section taken substantially along the lines V—V of Fig. 4.

Figs. 6 and 7 correspond respectively to the views of Figs. 1 and 2 but of another modified construction.

Fig. 8 is a longitudinal sectional view of a dynamo electric machine constructed somewhat after the manner of the construction illustrated in Figs. 1 and 2 but slightly modified for use as a portable grinder, one type of grinder being shown associated therewith for operation through transmission gears, and Fig. 9 is an elevational view of the dynamo electric machine of Fig. 8.

The dynamo electric machine illustrated in Figs. 1, 2, and 3 comprises a shaft 8 carrying a laminated core 9 through which conductor bars 11 extend to form a squirrel-cage armature or rotor, the end portions 12 of which may be formed as fan blades by which to maintain air circulation within the confines of the primary housing hereinafter described. The stator, which in the embodiments illustrated is the field, includes a laminated core 13, the laminae of which are stamped and stacked in register to provide longitudinal slots 14 in which windings 15 are disposed and held by slot closers 16. The field laminae 13 may be held together and in place by a thin tubular shell 17 of magnetic iron, the edges or ends of which may be crimped or rolled in against the end laminae as shown at 18.

One end of rotor shaft 8 is mounted in a self-sealing bearing 19 disposed in a recess 21 formed in a cast end bell or end casing member 22 which has a plurality of integrally cast cooling fins 23 extending radially from its hub to its outer rim portion. At the other end of the rotor the shaft is mounted in another self-sealing bearing 24 disposed in a recess 25 formed in another cast end bell or end casing member 26 which is provided with a plurality of integral fins 27 extending radially outward from the hub. Each end casing member is substantially cup shaped and so proportioned that when aligned with one another and in place, the rims abut against the crimped edges 18 of the field shell 17 circumferentially thereof to effect a dust and dirt tight joint therewith. The fins 23 and 27 preferably extend slightly beyond the rims where they may abut the outer surface of the shell 17 thereby to position the end casing members with respect to the stator core and one another. At predetermined places about their rims, the end casing members 22, 26 are provided with sets of bosses 28, 29, respectively, which are drilled and one set tapped for the reception of bolts 31 which hold the end casing members together and in place. Preferably the fins 23 and 27 are equal in number and, when the end casing members and stator are assembled, they are substantially in register.

Arranged to slip over the outer edges of the outer ends of fins 23, 27 with a sliding fit is a cast or otherwise formed and generally tubular casing member 32 which at one end carries a circumferentially extending and inwardly projecting boss 33 the outer and inner surfaces 34 and 36, respectively, of which are tapered. The surface 34 is designed to cooperate with the blades 37 of a fan disc 38, mounted upon and secured to the reduced outwardly projecting end 39 of the shaft 8, for the purpose of directing air radially outward. The surface 36 is for the purpose of directing air over and between the fins 27 so as to cool the end casing member 26, it being understood that air is induced by the fan blades 37 to flow between the longitudinally extending portions of fins 23, across the surface of shell 17, between the longitudinal portions of fins 27, thence radially inward over the outer surface of end casing member 26 and the radially directed portions of fins 27, and thence radially outward of the casing. The surface 36 may abut a correspondingly tapered surface on the fins 27 to position the casing 32. A cup shaped stamping or the like 41 forming a guard, has a series of apertures 40 extending about its rim portion 42 for substantially free egress of air driven by the fan and, preferably, the rim makes a tight friction fit over the end of casing member 32 although it may be otherwise secured thereon. Stud bolts 30 may be secured through the casing 32 into the bosses 29 thereby to secure the casing 32 in place.

In operation, heat generated within the rotor and stator is transferred by conduction and convection to the end casing members and to the shell 17 from the surfaces of which, including the fin surfaces, the air, flow of which is induced by the fan, receives and dissipates it. The fins on the end casing members provide a large surface area for the conduction and dissipation of internal heat and, in this connection, it may be noted that the end connections 15a of the stator windings are brought into thermal but not electrical contact with and substantially continuously throughout the circumference of the inside surfaces of rim portions of the end casing members the better to transfer heat developed within the windings and casing enclosure to the casing and fins.

The construction illustrated in Figs. 4 and 5 differs from the construction shown in Figs. 1, 2 and 3 only in the manner in which the stator laminae are formed and secured together. In this embodiment the laminae are punched or stamped to provide integral fin or rib portions 43 of which a predetermined number designated 44 may be made wider than the rest and punched or drilled for long rivets 45 which pass therethrough and through small washers 46 to secure the laminae together. The spaces between the ribs or fins 43, 44 are arranged to register with the spaces between the radial and longitudinal fins on the end casing members.

In the embodiment of Figs. 6 and 7, the stator laminae 47 are forced into a tubular casing member 48 which may have integral, longitudinally extending fins 50 on its external surface adapted to register with the fins on the end casing members and which has a plurality of bosses 49 for the threaded reception of screws 51 which pass through bosses 52 carried by the end casing members. In this case the inwardly directed and circumferentially extending projection 53 is cut away at the necessary places for the passage of bosses 52 and screws 51. In each of the embodiments so far described the outer casing or air jacket member may have a stand or leg bearing portion 54 but this may be omitted or otherwise formed as desired. In this case the end connections 15b of the windings 15' are brought into thermal contact with internal surface portions of the ends of casing member 48 after the manner of end connections 15a described in the description of Figs. 1 and 2.

The portable motor grinder shown in Figs. 8 and 9 includes a motor the construction of which differs from the construction illustrated in Figs. 1, 2 and 3 only in such respects as are necessary to adapt it to its intended purpose as a grinder. The left hand end casing member has an integral switch housing or box 55 while the right hand or power take-off end has four (4) or more bosses 56 integral with the air jacket member or outer sleeve 57 against which registering bosses 58 on a disc-shaped guard and bearing support 59 are disposed and secured by bolts or screws 61, the screws 61 also serving to secure a gear casing and handle structure 62 in place. Except at the bosses 56, 58, the casing 57 and disc guard 59 are separated to permit the free outward flow of air circumferentially of the casing. A bushing 63 secured to the shaft and to the fan 64 finds bearing within the support 59. The windings of the stator and the end connections, in this embodiment have been designated 15'' and 15c, respectively.

At its outer end the motor shaft carries a pinion 65 which meshes with a pinion 66 carried by an arbor 67 supported in bearings 68 and 69 in casing 62. A grinding wheel 70 is shown removably mounted on the outer end of arbor 67. The gears 65, 66 may be run in a bath of grease or other lubricant and to such end a lubricant fitting 71 having a valve provides a connection for a grease gun to permit lubricant to be fed into the casing 62.

While the many novel features of the invention will no doubt be apparent, it will not be harmful to emphasize certain of them. The construction is such that the cooling fans may be unusually large, and the fan exhaust is free and direct providing rapid and effective heat conduction and dissipation. The air ducts or passageways are direct or straight and short so as to admit of ready accessibility for easy and quick cleaning, most essential for dirty conditions of use. The motor sealing against ingress of dirt and dust is complete and effective, and little friction occurs at the surface of the shaft extension. The castings used require no delicate or complicated cores or difficultly carried out molding processes. The transfer of heat from the stator winding is direct and efficiently effective and is effected in three ways; namely, through the stator iron, by contact with the end casing members, and by air circulated by the fan blades on the ends of the rotor.

Although I have illustrated only four (4) embodiments of the invention, it will be appreciated and understood that many other embodiments may be devised. Consequently, I do not desire to be limited to the forms shown for illustration but only by the spirit of the invention and the scope of the appended claims.

I claim:

1. In an air cooled dynamo electric machine, a stator core including laminae and windings means including separable end casing members enclosing said laminae and windings in dust excluding relation, a generally tubular casing surrounding said stator and portions of said end casing members and in spaced relation thereto, said casing being slidably removable longitudinally of the stator and end casing members and independent thereof, a plurality of heat conducting fins extending axially of said casing in spaced relation to one another circumferentially between said casing and stator, said fins being in thermal contact with said stator and supporting and guiding said casing into position, a rotor within said stator, a shaft for said rotor extending through one of said end casing members, means carried by said shaft for creating a flow of air along said fins longitudinally of said tubular casing and toward said flow creating means, and means for directing air over a portion of the exterior surface of the end casing member through which said shaft extends, said air directing means including a radially inward extending circumferential projection on said tubular casing.

2. In an air cooled dust proof dynamo electric machine, a stator including a core and windings axially aligned end casing members abutted against the ends of said core in dust proof relation therewith and enclosing said windings, one of said end casing members having an axial opening for the passage of a rotor shaft, one of said end casing members having radially directed cooling fins on the external surface thereof, said stator core having a plurality of substantially integral longitudinally extending cooling fins providing longitudinal air passageways substantially in register with the spaces between the outer radial ends of the cooling fins on said end casing member, a jacket casing surrounding and extending longitudinally of said stator, said jacket casing being slidable longitudinally of said stator and end casing members on at least some of said core cooling fins, and means projecting radially inward at one end of said jacket casing and cooperative with at least one of the cooling fins on said end casing for positioning said jacket casing longitudinally of said stator.

3. In an air cooled dust proof dynamo electric machine, a stator including a core and windings, axially aligned end casing members abutted against the ends of said core in dust proof relation therewith and enclosing said windings, one of said end casing members having an axial opening for the passage of a rotor shaft, one of said end casing members having radially directed cooling fins on the external surface thereof, said stator core having a plurality of substantially integral longitudinally extending cooling fins providing longitudinal air passageways substantially in register with the spaces between the outer radial ends of the cooling fins on said end casing member, a jacket casing surrounding and extending longitudinally of said stator, said jacket casing being slidable longitudinally of said stator and end casing members on at least some of said core cooling fins, means on said jacket casing and cooperative with at least one of the cooling fins on said end casing for positioning said jacket casing longitudinally of said stator, a rotor within said stator and having a shaft passing through said end casing member opening to the exterior side of the end casing member, and a fan carried by said shaft at the exterior of said end casing member and adapted to create a flow of air between and along said fins and between said jacket casing and said stator.

4. In an air cooled dust proof dynamo electric machine, a stator including a core and windings, axially aligned end casing members abutted against the ends of said core in dust proof relation therewith and enclosing said windings, one of said end casing members having an axial opening for the passage of a rotor shaft, one of said end casing members having radially directed cooling fins on the external surface thereof, said stator core having a plurality of heat conducting longitudinally extending cooling fins in thermal contact therewith and providing longitudinal air passageways substantially in register with the spaces between the outer radial ends of the cooling fins on said one of said end casing members, a jacket casing surrounding and extending longitudinally of said stator, said jacket casing being slidable longitudinally of said stator and end casing members on at least some of said core cooling fins, means projecting radially inward at one end of said jacket casing and cooperative with the cooling fins on said one of said end casing members to form air passages extending over portions of said one of said end casing members and between said fins thereon, a rotor within said stator and having a shaft passing through said end casing member opening to the exterior side of the end casing member, and a fan carried by said shaft at the exterior of said end casing member and adapted to create a flow of air along said air passageways.

5. In an air cooled dust proof dynamo electric machine, a stator including a core and windings, axially aligned end casing members abutted against the ends of said core in dust proof relation therewith and enclosing said windings, one of said end casing members having an axial opening for the passage of a rotor shaft, one of said end casing members having radially directed cooling fins on the external surface thereof, said stator core having a plurality of heat conducting longitudinally extending cooling fins in thermal contact therewith and providing longitudinal air passageways substantially in register with the spaces between the outer radial ends of the cooling fins on said one of said end casing members, a jacket casing surrounding and extending longitudinally of said stator, said jacket casing being slidable longitudinally of said stator and end casing members on at least some of said core cooling fins, means projecting radially inward at one end of said jacket casing and cooperative with the cooling fins on said one of said end casing members to form air passages extending over portions of said one of said end casing members and between the fins thereon, a rotor within said stator and having a shaft passing through said end casing member opening to the exterior side of the end casing member, a fan carried by said shaft at the exterior of said end casing member and adapted to create a flow of air along said air passages and over said stator and said portions of said end casing member, and a cup-shaped cover cap having an opening in its bottom for passage of said shaft and a series of apertures about its rim portion, said cap covering said fan and the adjacent end of said machine, said rim portion being engaged over the adjacent end of said jacket casing with said apertures in operative position with respect to said fan.

6. In an air cooled dust proof dynamo electric machine, a stator including a core and windings, axially aligned end casing members abutted against the ends of said core in dust proof relation therewith and enclosing said windings, one of said end casing members having an axial opening for the passage of a rotor shaft, one of said end casing members having a set comprising a plurality of radially directed cooling fins on the external surface thereof, said stator core having a set comprising a plurality of heat conducting longitudinally extending fins in thermal contact therewith and providing longitudinal air passageways substantially in register with the spaces between the outer radial ends of the cooling fins on said one of said end casing members, a jacket casing surrounding and extending longitudinally of said stator, means projecting radially inward at one end of said jacket casing and cooperative with certain of the cooling fins on said one of said end casing members to cause air to flow from passages between adjacent fins of one set into passages between adjacent fins of the other set, a rotor within said stator, a rotor shaft extending through the opening in said one of said end casing members, a cup-shaped cap having a shaft opening in its bottom and apertures circumferentially about a rim portion thereof, disposed over the rotor shaft with its rim portion secured to said jacket casing, said cup having its bottom spaced from the adjacent end casing member, and air circulating means between said cap and the adjacent end casing member.

7. In an air cooled dust proof dynamo electric machine, a stator including a core and windings, axially aligned end casing members abutted against the ends of said core in dust proof relation therewith and enclosing said windings, one of said end casing members having an axial opening for the passage of a rotor shaft, one of said end casing members having a set comprising a plurality of radially directed cooling fins on the external surface thereof, said stator core having a set comprising a plurality of heat conducting longitudinally extending fins in thermal contact therewith and providing longitudinal air passageways substantially in register with the spaces between the outer radial ends of the cooling fins on said one of said end casing members, a jacket casing surrounding and extending longitudinally of said stator, a rotor within said stator, a rotor shaft extending through the opening in said one of said end casing members, a cup-shaped cap having a shaft opening in its bottom and apertures circumferentially about a rim portion thereof, disposed over the rotor shaft with its rim portion engaged with the adjacent end of said jacket casing, said cup having its bottom spaced from the adjacent end casing member, air circulating means between said cap and the adjacent end casing member, said air circulating means being constructed and arranged to force air outwardly through said apertures, and means for deflecting air which has passed between said set of longitudinal fins into and through portions of the passages between the fins of said set of radial fins.

8. In an air cooled dust proof dynamo electric machine, a stator including windings, means including axially aligned end casing members substantially enclosing said stator in dust proof condition, one of said end casing members being imperforate and the other having an opening for the passage of a rotor shaft, a tubular casing member, said casing member having an internally projecting positioning abutment portion at one end, and being internally cylindrical and substantially devoid of internal projections at its other end, said stator enclosing means including an abutment cooperatively engageable with said tubular casing member abutment portion for positioning said tubular casing member and stator enclosing means in predetermined longitudinal relationship to one another, said tubular casing member being disposed in removable telescoping relationship over said stator enclosing means and being spaced from said stator enclosing means circumferentially thereabout and longitudinally thereof throughout their coextensive lengths, radially directed and longitudinally extending and circumferentially spaced cooling fins between said tubular casing member and stator enclosing means, and means for drawing said abutments together to secure said tubular casing member to said stator.

9. In an air cooled dust proof dynamo electric machine, a stator including a core and windings, axially aligned end casing members abutted against the ends of said core in dust proof relationship therewith and enclosing said windings, one of said end casing members having an axial opening for the passage of a rotor shaft, one of said end casing members having radially directed cooling fins on the external surface thereof, said stator having a plurality of substantially integral longitudinally extending cooling fins thereabout, said stator cooling fins providing longitudinal air passageways, a jacket casing of tubular shape surrounding and extending longitudinally of said stator substantially throughout the length of the latter, said jacket casing being slidable longitudinally of and telescoping over said stator core and end casing members and being spaced from said stator circumferentially and longitudinally by at least some of said longitudinal cooling fins, abutment means secured to and projecting inward at one end of said jacket casing and cooperative abutment means on one of said end casing members for positioning said jacket casing longitudinally of said stator, said jacket casing being substantially cylindrical and devoid of internal projections from said abutment end to and including its opposite end whereby said jacket casing and stator may be telescoped together, and means for drawing said abutments together to secure said jacket casing and stator in assembled condition.

10. In an air cooled dust proof dynamo electric machine, a stator including a core and windings, axially aligned end casing members abutted against the ends of said core in dust proof relationship therewith and enclosing said windings, one of said end casing members having an axial opening for the passage of a rotor shaft, one of said end casing members having a set comprising a plurality of cooling fins on the external surface thereof, said stator core having a set comprising a plurality of heat conducting longitudinally extending fins in thermal contact therewith and providing longitudinal air passageways, a jacket casing surrounding and extending longitudinally of said stator and spaced from said stator throughout its circumference and length, a rotor within said stator, a rotor shaft extending through the opening in said one of said end casing members, a cup-shaped cap having a shaft opening in its bottom disposed over said rotor shaft with its rim portions secured to the adjacent end of said jacket casing, said cup having its bottom spaced from the adjacent end casing member, there being a substantially circumferential aperture between said cup bottom and said jacket casing, and air circulating means between said cap and the adjacent end casing member, said air circulating means being constructed and arranged as to draw air longitudinally of the stator between said longitudinal fins and to force such air outwardly through said aperture.

RALPH M. GASTON